United States Patent [19]

Chen

[11] Patent Number: 5,212,364
[45] Date of Patent: May 18, 1993

[54] ARC WELDING CIRCUIT FOR WELDING THIN METAL PIECES

[76] Inventor: Qing-Sheng Chen, 350 Prince Arthur St. W., #D404, Montreal, Quebec, Canada, H2X 3R4

[21] Appl. No.: 897,946

[22] Filed: Jun. 15, 1992

[51] Int. Cl.$^5$ .............................................. B23K 9/10
[52] U.S. Cl. ........................ 219/137 PS; 219/130.21; 219/130.4
[58] Field of Search .......... 219/137 PS, 130.4, 130.21, 219/130.5, 130.1

[56] References Cited

U.S. PATENT DOCUMENTS 2,617,913 11/1952 Oestreicher .................... 219/130.21
3,301,996 1/1967 Bidwell ........................... 219/130.4
4,628,180 12/1986 Edberg ............................. 219/130.4

Primary Examiner—Clifford C. Shaw

[57] ABSTRACT

An AC arc welding circuit for controlling current supplied to a welding electrode for welding thin metal pieces. A coupling circuit connects a capacitance circuit between a terminal of the secondary winding of a power supply transformer and the welding electrode. The other terminal of the secondary transformer is connected to the common electrode of the secondary winding which is, in turn, connected to a thin metal piece to be welded. The control circuit is provided with a sensing coil to sense the current flowing in the thin metal piece and to initiate a trigger pulse to switch a TRIAC to short-circuit the capacitance circuit during a predetermined short time as determined by the timing circuit so as to provide for a high voltage high current supply to the welding electrode during arc initiating when the electrode is spaced from the metal piece. After the predetermined time, the capacitance circuit is reconnected to the electrode to supply a low steady arc current so that the thin metal piece is not punctured during the initiating arc period and during the welding period.

20 Claims, 2 Drawing Sheets

ARC WELDING CIRCUIT FOR WELDING THIN METAL PIECES

TECHNICAL FIELD

The present invention relates to an AC arc welding control circuit and method of controlling current supplied to a welding electrode for welding thin metal pieces in the range of about 0.2 to 2 mm, and wherein the arc current is controlled during arc initiating and during welding to prevent excessive heating and puncture of the metal pieces, and further wherein the welding electrode is connected to the supply through a switchable capacitance circuit to provide a stable low welding current and a high efficiency power transfer.

BACKGROUND ART

Conventional arc welders utilize different methods to weld thin metal sheets having thickness smaller than 2 mm, and these usually comprise laser welders which are capable of welding super-thin metal sheets. However, these welding machines are very costly and therefore have a very limited market. Another known technology for welding thin metal sheets is the ion welders, and these are also very expensive and costly to maintain. Another type of known welding machine for welding thin metal sheets is the gas isolation welder. It is a bulky machine and pollutes the environment as they burn propane gas and are not suitable for welding thin sheets. They are also very dangerous to handle due to the risk of explosion of the gas, and require excessive maintenance.

The major problem that one encounters when welding thin metal sheets is to try and control the arc initiation and welding arc such as not to overheat or burn through the metal sheet. Puncturing occurs in metal sheets due to the high temperature created by the high voltage and current necessary to initiate the arc, and this often occurs in the area where the electrode has to touch the thin metal part in order to cause an arc to form. A large surge of voltage and current must be produced in order to generate an initial arc. To generate an arc the welder must pull back the welding electrode a short distance above the metal sheet very quickly. Thereafter, the welding arc must be maintained at a substantially reduced current flow in order not to cause the sheet to heat up, which can cause puncture or melt through. Because of the problem in welding thin metal sheets, conventional arc welding machines of the prior art are not used when the sheets are below 4 mm in thickness.

Welding circuits have been designed in the prior art in an attempt to solve the above-mentioned problem. However, known welding circuits do not provide the necessary automatic control and fine adjustment which is required when welding very thin or super-thin metal sheets or metal parts together. With known circuit designs considerable trial and error attempts are made in welding the thin metal parts, and this results in substantial waste of expensive material, low productivity, low product yield rate, loss of expensive time, and low quality products. These welding machines also require highly skilled labor, expensive machinery, and are usually time consuming to set up. Also, when the thin metal is punctured or melted through the molten metal debits usually scatter over other parts, and additional labor is required to clean up the scattered metal and to repair the punctured holes in the metal pieces. Accordingly, no adequate solution has been developed for welding thin or super-thin metal parts, such as metal pieces having thicknesses in the range of about 0.2 to 2.0 mm.

DISCLOSURE OF INVENTION

It is desirable with AC arc welder controllers to control the voltage and current during the following time periods in the welding process:

(i) engagement time period during which the welding electrode is physically moved into engagement with the metal piece to be welded;

(ii) initiation time period during which the welding electrode is moved away from the metal piece to form an initiation arc to commence a welding work;

(iii) weld time period during which the electrode is maintained a distance from the work and sustains the arc to continue the welding procedure; and (iv) off time period during which the welding electrode physically departs so that it may be repositioned and ready for another weld.

It is a feature of the present invention to provide an AC arc welding control circuit and method of operation for controlling voltage and current supplied to a welding electrode for welding thin metal pieces and which substantially overcomes the above-mentioned disadvantages of the prior art.

Another feature of the present invention is to provide an AC arc welding circuit to control the arc initiation time period and intensity of the welding current during the welding procedure.

Another feature of the present invention is to provide an AC arc welding circuit for controlling current supplied to a welding electrode and wherein a selectable steady low arc current value can be maintained by utilizing a capacitance circuit connected between the secondary of a power supply transformer and the welding electrode.

Another feature of the present invention is to provide an AC arc welding circuit for controlling voltage and current supplies to a welding electrode for welding thin metal pieces and wherein quality welds can be achieved, and wherein the welding electrode is easy to operate and require less skillful work, and further wherein the circuit is mountable in a portable welding machine which is easy to transport and which results in substantial cost savings.

Another feature of the present invention is to provide an AC arc welding circuit which may be integrated in conventional AC arc welding machines and which is capable of maintaining a steady low arc current value within the range of 5 to 7 amperes, thus providing a high efficiency power transfer resulting in lower power loss and lower power costs.

Another feature of the present invention is to provide an AC arc welding circuit for controlling current supplied to a welding electrode for welding thin metal sheets together and wherein a clean weld is achievable on both sides of metal sheets welded together while welding is being effected on one side only and wherein no repairs are required to the welded pieces due to the quality of the weld thereby eliminating the necessity of having to work the weld prior to painting, or subjecting the metal parts to further treatment.

Another feature of the present invention is to provide an AC arc welding circuit for controlling the high voltage high current supply to a welding electrode during a predetermined time period to initiate the arc, and wherein the high voltage high current value is adjustable depending on the thickness of the metal parts being welded.

Another feature of the present invention is to provide an AC arc welding circuit having a timing circuit that automatically adjusts and generates cold-start and hot-start modes in order to give excellent metal connection which is useful in welding small products and which will avoid melting and bending of thin metal sheets due to overheating.

Another feature of the present invention is to provide an AC arc welding circuit for controlling current supplied to a welding electrode for welding thin metal pieces, and wherein the arc is environmentally clean, as it does not generate any pollutants. The output welding current may also be supplied in the range of 3 to 55 amperes or 5 to 80 amperes to weld super-thin to medium-thin metal sheets from 0.2 to 4 mm in thickness. Also by utilizing specially formulated solder there can be provided a higher efficiency melt to connect the metal pieces.

According to the above features, from a broad aspect, the present invention provides an AC arc welding circuit for controlling current supplied to a welding electrode for welding thin metal pieces. The welding electrode is connected to a first terminal of a secondary winding of a power supply transformer through a coupling means having a capacitance circuit to supply a low voltage and high short circuit current when the electrode is placed in contact with the thin metal piece to be welded. Switching means is provided for shorting the capacitance circuit. Sensing means is provided for sensing the high short circuit current flow in said metal piece, and producing a resultant voltage signal. Circuit means is provided to compare the resultant voltage signal with a preset reference voltage value to produce a triggering signal for a predetermined time period to actuate the switching means to short the capacitance means to initiate an arc by feeding a high voltage to the electrode. Substantially simultaneously an open contact high voltage high current welding gap is established between the electrode and the metal piece by pulling back on the electrode. Timing circuit means is provided to cut off the triggering signal after a predetermined time constant to reconnect the capacitance means. The capacitance means maintains a steady low arc current value between the welding electrode and the metal piece during a welding time period after arc initiation.

DESCRIPTION OF THE DRAWINGS

A preferred embodiment of the present invention will now be described with reference to the accompanying drawings in which.

DESCRIPTION OF PREFERRED EMBODIMENTS

Figure 1:
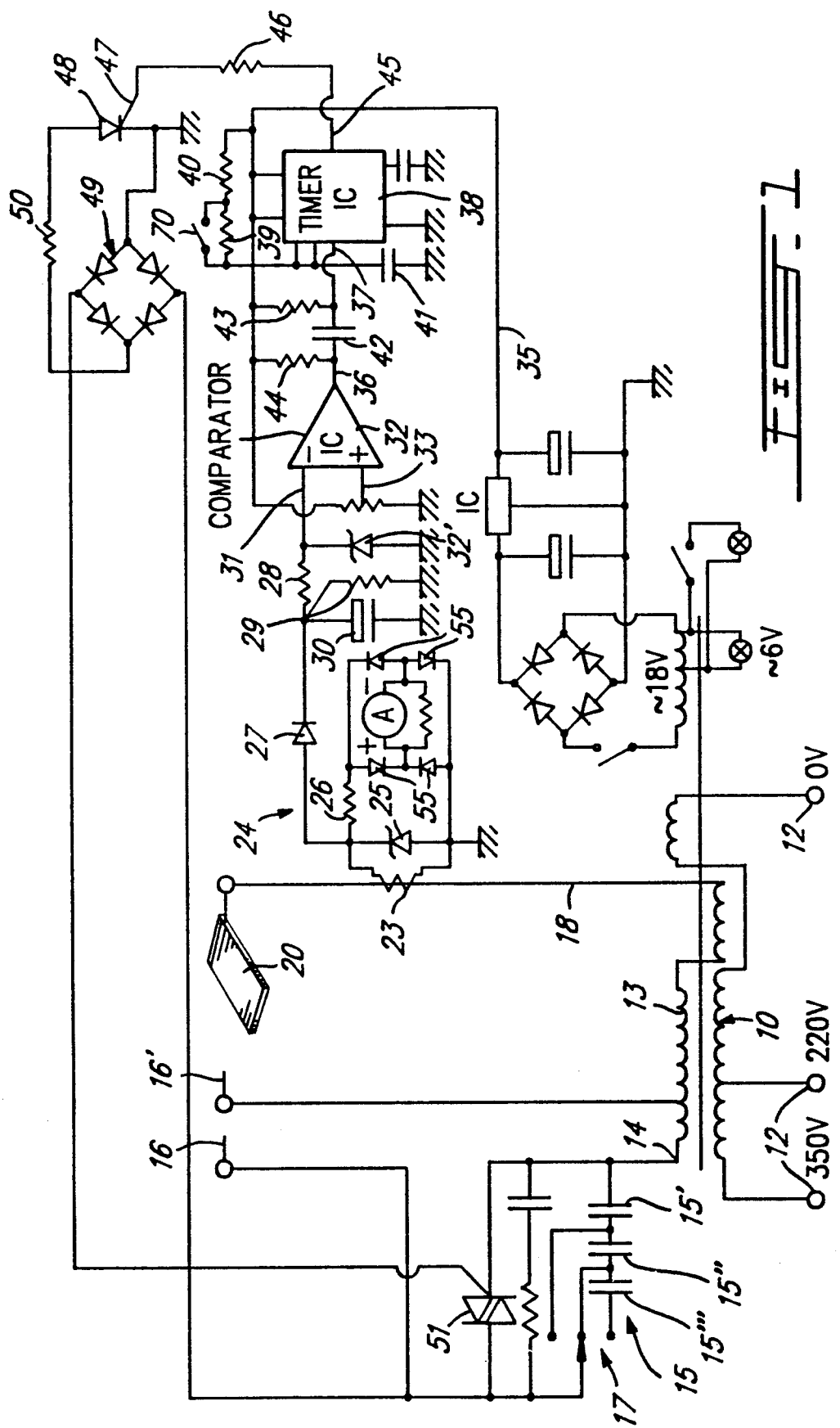
FIG. 1 is a schematic diagram of the AC arc welding control circuit of the present invention for controlling current supplied to a welding electrode for welding thin metal pieces.

Referring to the drawings and more particularly to FIG. 1, there is shown at 10 a power supply transformer having its primary coil 11 connectable to a 380 V or a 220 V AC supply 12. The secondary coil 13 of the transformer is herein shown as interlaced with the primary coil 11 and has a first terminal 14 thereof connected to a capacitance circuit 15 which, in turn, is connected to the welding electrode 16 through a switch 17. The terminal 18 at the other end of the secondary winding 13 is connected to a common electrode connection 19 which is, in turn, connected to a thin metal piece 20 to be welded.

Figure 2:
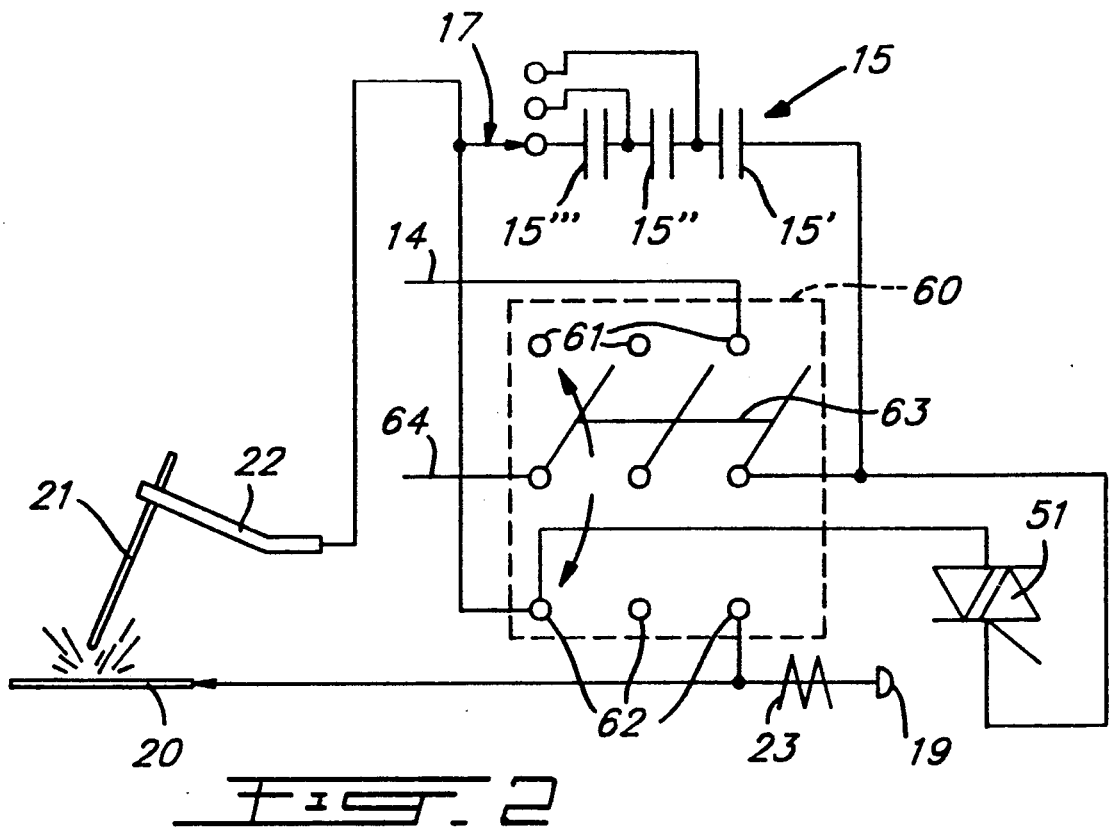
FIG. 2 is a schematic diagram illustrating a switching circuit for selecting the value of the power supply to feed the welding electrode dependent if a thin or normal metal thickness is being welded.

In order to initiate a welding arc to commence welding, it is necessary for the welding electrode 16, usually a thin rod of solder 21 connected to a blow pipe 22, as shown in FIG. 2, to be placed in contact with the thin metal sheet 20. At the instant the welding electrode 16 or the solder rod 21 physically touches the metal sheet where a weld is to start, a short circuit condition is established across the secondary winding. Because of the capacitance circuit 15 connected to the electrode, a low voltage high current supply is fed to the electrode. The high short circuit current exceeds 50 amperes and flows through the metal piece 20 and the common electrode connection 19.

The control circuit of the present invention senses this high current flow through the common electrode connection 19 by means of the sensor coil 23 which is connected to a shaping circuit 24 consisting of a zener diode 25, resistance 26, diode 27, and coupling resistors 28, 29 and capacitor 30 to feed a resultant voltage signal to the input 31 of an operational amplifier 32 which acts as a comparator. This resultant voltage signal is clamped by the zener diode 32'. The other input 33 of the operational amplifier 32 is provided with a variable resistor 34 which is coupled to the power supply line 35, and serves to adjust a reference voltage value on the second input 33.

When the high short circuit current flows through the common electrode 19 the resultant voltage signal at the input 31 of the amplifier 32 produces a negative output signal at the output 36 of the operational amplifier 32. This negative signal is coupled to the input 37 of a monostable multivibrator circuit 38 which acts as a timer circuit together with the RC circuit formed by resistances 39 and 40 and capacitor 41. Capacitor 42 and resistance 43 are coupling elements while resistance 44 provides a feedback signal to the input 33 of the operation amplifier 32.

A signal appears at the output 45 of the timer circuit 38, and is coupled through resistance 46 to the gate 47 of the silicon control rectifier 48 which is triggered, and produces an output signal that is fed to the rectifier bridge 49 through resistance 50. The bridge 49 is connected across the TRIAC switch 51 and short-circuits, in this particular instance the series connected capacitances 15' and 15". This connects the electrode directly to the secondary providing the high voltage necessary to initiate the arc. Substantially simultaneously the operator pulls back the welding element 16 from its contact with the metal sheet 20 to produce the welding arc.

The RC circuit of the timing circuit 38 has a time constant which is expressed by the formula $t = 1.1\,RC$ and it provides sufficient time for the welding electrode 16 to initiate an arc with the metal piece 20. After the time delay, the output of the timing circuit charges and cut off the control rectifier 48 and reconnects the capacitance circuit in series with the welding electrode. The welding current is then maintained at a substantially predetermined steady state low value, in the range of from about 5 to 7 amperes, as determined by the position of the switch 17. It is desirable to immediately drop the current as the thin metal must not be overheated since this would cause the electrode arc to puncture through the metal. With the low welding current now flowing through the common electrode, the control circuit remains on stand-by.

The position of the switch 17 is what determines which of the capacitors 15', 15" and 15'" is connected in series with the welding electrode, and the selected quantity of capacitances provides a means of adjusting the low welding current which is maintained in a substantially steady state. These capacitors also make it possible to achieve a high efficiency power factor, and accordingly there is less energy loss, or to put it in another manner, a higher cosine O is obtained and a power saving is achieved.

Referring now to FIG. 2 there is shown a further optional modification of the circuit and wherein a voltage supply switch 60 may be connected between the secondary winding 13 of the transformer and the common electrode 19 and the welding electrode through the capacitance circuit 15. The voltage supply switch 60 is a three-pole double throw switch having a first set of switch terminals 61 connected to the first terminal 14 of the secondary winding 13, and a second set of terminals 62 connected to the common electrode 19 through the switch arm 63. The TRIAC 51 is also connected to the second set of terminals 62. The other side of the TRIAC is connected to the switch arm 63. As can be seen the switch arm is also connected to a tap 64 which is connected to the secondary winding 13 shown in FIG. 1 to connect a reduced voltage through the welding electrode, such as shown at 16' in FIG. 1. This tap position is preferable when welding thin metal pieces in the range of a 2.0 to 4.0 mm thickness. When the metal pieces are thinner than 2.0 mm, in the super-thin range down to 0.2 mm, it is preferable to supply the electrode 16 with a higher voltage as the current is lower, and there is less chance of damaging the super-thin metal piece.

Figure 3:
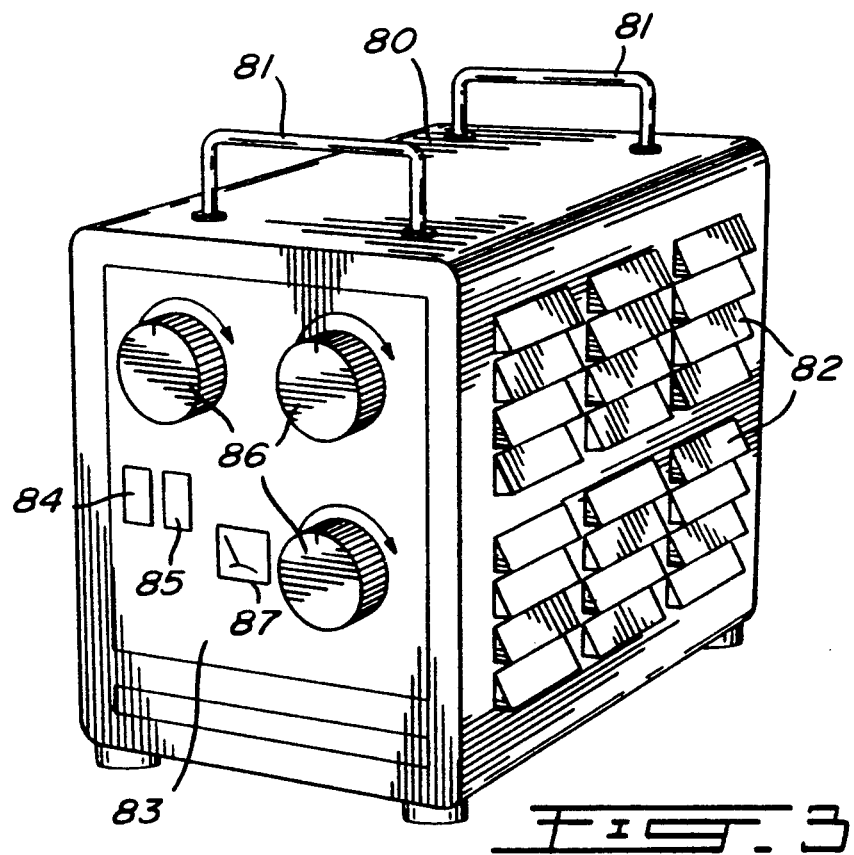
FIG. 3 is a perspective view of a housing of a welding unit incorporating the welding circuit of the present invention.

FIG. 3 is a physical representation of how the arc welding circuit of the present invention may be packaged. As herein shown, the housing 80 is provided with handlebars 81 to permit easy transport of the housing. The housing is provided with ventilating louvers 82 on the side walls thereof for dissipating heat from inside of the housing. The control panel 83 is provided with pilot lamps 84 and 85 to indicate the operation of the circuit as well as switches 86 to select the proper settings of the capacitance circuit, the voltage supply from the secondary and the reference signal. The meter 87 connected in the diode bridge 55 across the coil 23 is also provided on this control panel indicated by reference numeral 87.

The welding efficiency can also be improved further by utilizing a specially formulated thin solder rod having characteristics in accordance with the following Table:

| FORMULA AND SPECIFICATIONS OF SUPER-THIN SOLDER | | | | |
| --- | --- | --- | --- | --- |
| | Tensile Strength | Yield Strength | Elongation | |
| Mechanical property | ≧420M Pa | ≧330M Pa | ≧18% | |
| | C | Mn | Si | S | P |
| Chemical composition | ≦0.10 | 0.3–0.6 | ≦0.25 | ≦0.035 | ≦0.04 |
| Reference welding current | ⌀0.8 5–10A | ⌀1.0 7–14A | ⌀1.2 11–22A | ⌀1.4 15–31A | ⌀1.6 21–42A |

Briefly summarizing the operation of the arc welding circuit of the present invention, the switch 17 selects the number of capacitors 15 to be connected in series with the welding electrode to establish the desired value of the low welding current. Previously, the control circuit was adjusted so that the reference voltage level at the input of the operational amplifier was set and the value of the RC circuit selected by the switch 70 which determines the resistance value of the RC network and establishes the necessary time delay constant to assure arc initiation. As soon as the welding electrode is in contact with the thin metal piece 20 to be welded, there is a lower voltage high current applied to the metal piece due to the capacitance circuit 15 being connected in series with the electrode. This high current flows in the common electrode of the transformer and is sensed by the sensing coil 23 which produces a resultant voltage signal which is compared with the reference signal at the inputs of the operational amplifier 32 causing the output of the operational amplifier to produce a negative signal which is fed to the timer circuit and actuates the multivibrator to produce a triggering signal at the output thereof to switch a TRIAC switch 51 through an SCR and a diode bridge circuit. This TRIAC switch short-circuits the capacitance circuit 15 thereby immediately supplying the high voltage to the welding electrode 16 necessary to initiate the arc. At substantially that instance, the welding electrode is withdrawn from the metal piece by the welder, but the high voltage high current supply is maintained until the expiration of the time delay of the timing circuit 38. After the RC time constant the monostable multivibrator or timer circuit 38 switches its output to cut off the triggering signal and in turn shuts off the TRIAC to re-establish the initial coupling circuit condition. The capacitor circuit 15 then becomes reconnected in series with the welding current as preset by the number of capacitors 15', 15", 15'" selected by the switch 17. This low current condition is also sensed by the control circuit and causes the output of the operational amplifier to revert to its initial condition.

It is within the ambit of the present invention to cover any obvious modifications of the preferred embodiment described herein, provided such modifications fall within the scope of the appended claims.

I claim:

1. An arc welding circuit for controlling current supplied to a welding electrode for welding thin metal pieces, said welding electrode being connected to a first terminal of a secondary winding of a power supply transformer through a coupling means having a capacitance circuit to supply a low voltage and high short circuit current when said electrode is placed in contact with said thin metal piece to be welded, switching means for shorting said capacitance circuit, sensing means for sensing said high short circuit current flowing through said metal piece and to produce a resultant voltage signal, circuit means to compare said resultant voltage signal with a reference voltage value to identify said high short circuit current and to produce a triggering signal to activate said switching means to short said capacitance circuit to supply a high voltage and high current to said welding electrode to initiate an arc while substantially simultaneously an open contact high voltage welding gap is established between said electrode and said metal piece by spacing said electrode therefrom, timing circuit means to cut off said triggering signal after a predetermined time constant to reconnect said capacitance circuit to said welding electrode said capacitance circuit maintaining a steady low arc current between said welding electrode and said metal piece after said arc initiating.

2. An AC arc welding circuit as claimed in claim 1 wherein said capacitance comprises two or more capacitors selectively connected in series, and wherein operable selective switch means is also provided to select a predetermined number of said capacitors to be connected in series to said welding electrode.

3. An AC arc welding circuit as claimed in claim 2 wherein said timing circuit means has an RC circuit to establish said predetermined time constant, said timing circuit maintaining said triggering signal a sufficient time to permit said arc to be initiated.

4. An AC arc welding circuit as claimed in claim 3 wherein said sensing means has a sensor coil to sense said high short circuit current flow, said sensor coil being connected to a shaping circuit to produce an output voltage which is modified by a clamping circuit to produce said resultant voltage signal.

5. An AC arc welding circuit as claimed in claim 4 wherein said circuit means to compare said resultant voltage signal is an operational amplifier acting as a comparator and having said resultant voltage signal fed to a first input thereof, said amplifier having said reference voltage on a second input thereof, said amplifier producing a negative output signal when said resultant voltage signal is of a predetermined value responsive to said high short circuit current, said timing circuit means being connected to said output of said amplifier.

6. An AC arc welding circuit as claimed in claim 5 wherein said second input of said amplifier has a variable resistance connected to a supply voltage to set said reference voltage to a desired value.

7. An AC arc welding circuit as claimed in claim 5 wherein said timing circuit means has an output which is connected to a control rectifier to produce said triggering signal which is capable of operating said switching means to short said capacitors connected in series with said welding electrode.

8. An AC arc welding circuit as claimed in claim 7 wherein said switching means is a TRIAC connected to said operable selective switch means and across said selectively connected capacitors.

9. An AC arc welding circuit as claimed in claim 7 wherein said operable selective switch means is a manually operable switch having a contact arm connected to said welding electrode send to a selected one of switch terminals, each said terminal connected between two capacitors of a series of said capacitors.

10. An AC arc welding circuit as claimed in claim 7 wherein there is further provided a voltage supply switch having a first set of switch terminals connected to said first terminal of said secondary winding and a second set of terminals connected to a common electrode connected to said thin metal piece and one side of said TRIAC which is connected to said capacitance means, a switch arm connected to a tap of said secondary winding and to an opposite side of said TRIAC, said voltage supply switch selecting a desired supply voltage value dependent on the thickness range of said thin metal piece to be welded.

11. An AC arc welding circuit as claimed in claim 4 wherein said sensor coil is connected to a common electrode which is connected to said thin metal piece, a meter connected in a diode bridge which is connected across said sensor coil to provide a visual indication of the presence of said high short circuit current.

12. AC arc welding circuit as claimed in claim 4 wherein said timer circuit is a monostable multivibrator circuit , said time constant of said RC circuit being expressed by $t = 1.1$ RC.

13. An AC arc welding circuit as claimed in claim 1 wherein said thin metal pieces are metal plate pieces having a thickness of about 0.2 to 4.0 mm.

14. An AC arc welding circuit as claimed in claim 1 wherein said welding electrode is a rod of solder material secured to a blow pipe of an electrical welder, said steady low arc current value being in the range of from 5 to 7 amperes.

15. An AC arc welding circuit as claimed in claim 1 wherein said power supply transformer has primary and secondary coils which are disposed interlaced with one another to minimize induction leakage and to provide for a wider range of output current adjustment.

16. A method of controlling an initiating arc and maintaining a substantially steady low arc welding current between a welding electrode and a thin metal piece to be welded, said method comprising the steps of:
(i) connecting said welding electrode to a terminal of a secondary winding of a power supply transformer through coupling means having a capacitance circuit;
(ii) connecting a common electrode from a further terminal of said transformer to a thin metal piece to be welded;
(iii) contacting said metal piece with said welding electrode to initiate a welding arc;
(iv) sensing a high current flow through said metal piece while said welding electrode is in contact with said metal piece to produce a resultant voltage signal;
(v) comparing said resultant voltage signal with a reference voltage value to produce a triggering signal;
(vi) actuating a switch with said triggering signal to short said capacitance circuit and supply high voltage to said welding electrode to initiate an arc;
(vii) substantially simultaneously establishing an open contact high voltage high current welding gap between said electrode and said thin metal piece; and
(viii) cutting off said switch after a predetermined time constant to reconnect said capacitance circuit to supply a steady low arc current to said welding electrode.

17. A method as claimed in claim 16 wherein there is further provided before step (i) the step of selectively connecting said coupling means and said welding electrode to said terminal of said secondary winding or a tap of said secondary winding.

18. A method as claimed in claim 17 wherein before step (i) there is further provided selectively connecting one or more capacitors in said capacitance circuit to adjust the value of said capacitance and said steady arc current.

19. A method as claimed in claim 18 wherein said step (iv) further comprises shaping and clamping said resultant voltage signal.

20. A method as claimed in claim 19 wherein there is further provided the step of setting said reference voltage to a desired value and producing a negative output signal at the output of an operation amplifier and feeding same to a timing circuit having an RC circuit, and producing said triggering signal at an output of said timing circuit during a time period established by said RC circuit.

* * * * *